US011513574B2

(12) United States Patent
Kelemen et al.

(10) Patent No.: US 11,513,574 B2
(45) Date of Patent: Nov. 29, 2022

(54) SYSTEM AND METHOD FOR CONTROLLING A RESET PROCEDURE

(71) Applicant: Arm Limited, Cambridge (GB)

(72) Inventors: Csaba Kelemen, Gyor (HU); Gergely Kiss, Budapest (HU); Balázs Mészáros, Pitvaros (HU)

(73) Assignee: Arm Limited, Cambridge (GB)

( * ) Notice: Subject to any disclaimer, the term of this patent is extended or adjusted under 35 U.S.C. 154(b) by 172 days.

(21) Appl. No.: 16/788,525

(22) Filed: Feb. 12, 2020

(65) Prior Publication Data

US 2021/0247825 A1 Aug. 12, 2021

(51) Int. Cl.
*G06F 1/26* (2006.01)
*G06F 1/24* (2006.01)

(52) U.S. Cl.
CPC . *G06F 1/26* (2013.01); *G06F 1/24* (2013.01)

(58) Field of Classification Search
None
See application file for complete search history.

(56) References Cited

U.S. PATENT DOCUMENTS

| 10,852,800 | B1 * | 12/2020 | Dang | G06F 30/34 |
| 2002/0053039 | A1 * | 5/2002 | Inoue | G06F 1/3203 |
| | | | | 713/323 |
| 2011/0022859 | A1 * | 1/2011 | More | G06F 1/3203 |
| | | | | 713/300 |
| 2012/0011098 | A1 * | 1/2012 | Yamada | G06F 11/1662 |
| | | | | 707/623 |

(Continued)

*Primary Examiner* — Danny Chan
(74) *Attorney, Agent, or Firm* — Nixon & Vanderhye P.C.

(57) ABSTRACT

A system and method are provided for controlling a reset procedure. The system has a plurality of power domains, where each power domain comprises a plurality of components, and a plurality of power controllers, wherein each power controller has at last one associated power domain and is arranged to control a supply of power to each associated power domain. The plurality of power controllers are arranged in a hierarchical arrangement comprising two or more hierarchical levels. A given power controller at a given hierarchical level is arranged to implement a reset procedure requiring a reset to be performed in a given reset domain, where the given reset domain comprises at least a subset of the components provided in multiple power domains associated with multiple power controllers provided in at least one hierarchical level below the given hierarchical level. The given power controller is arranged to initiate a reset procedure by issuing a reset entry request for receipt by each of the multiple power controllers. Each power controller is arranged, on accepting the reset entry request, to perform a reset preparation procedure in respect of each associated power domain within the multiple power domains, and then to issue a response signal to confirm that the reset preparation procedure has been performed. In response to detecting that the response signal has been issued by each of the multiple power controllers, the given power controller asserts a reset signal to the multiple power domains providing components of the given reset domain in order to cause the reset to be performed in a synchronised manner in respect of all of the components in the given reset domain.

15 Claims, 7 Drawing Sheets

(56) References Cited

U.S. PATENT DOCUMENTS

| 2012/0054511 A1* | 3/2012 | Brinks | G06F 1/26 |
| | | | 713/310 |
| 2013/0073878 A1* | 3/2013 | Jayasimha | G06F 1/3287 |
| | | | 713/300 |
| 2018/0101219 A1* | 4/2018 | Ross | G06F 1/3287 |
| 2019/0095224 A1* | 3/2019 | Zhong | G06F 9/4418 |
| 2019/0250697 A1* | 8/2019 | Mocanu | G06F 3/0659 |
| 2019/0278733 A1* | 9/2019 | Kessler | G06F 1/26 |

* cited by examiner

SYSTEM AND METHOD FOR CONTROLLING A RESET PROCEDURE

BACKGROUND

The present technique relates to a system and method for controlling a reset procedure.

In particular, a system may be provided that has a plurality of power domains, where each power domain comprises a plurality of components. In addition, a plurality of power controllers may be provided, where each power controller has at least one associated power domain and is arranged to control supply of power to each associated power domain.

Each power controller may have the ability to perform a reset in respect of its associated power domain(s). However, an issue can arise where the reset domain containing the components that need to be subjected to the reset span multiple power domains managed by different power controllers. Whilst each of the relevant power controllers could be requested to perform a reset in respect of the relevant components within its associated power domain, this could give rise to a lack of coordination in the performance of the reset in respect of the components forming the reset domain. For example, if the reset is performed in a distributed manner using multiple power controllers, this could cause long transitional system states. It could also lead to only a partial reset being performed within the reset domain, for example due to one or more of the relevant power controllers rejecting the reset request (for instance because they are waiting for a component within an associated power domain to complete an action before it would be possible to process the reset request). Performance of only a partial reset of the reset domain is highly undesirable, as it can lead to unexpected consequences, such as corruption of certain data within the system.

Accordingly, it would be desirable to provide an improved mechanism for handling a reset procedure in respect of a reset domain that comprises components provided in multiple power domains that are associated with different power controllers.

SUMMARY

In one example arrangement, there is provided a system comprising: a plurality of power domains, each power domain comprising a plurality of components; and a plurality of power controllers, wherein each power controller has at least one associated power domain and is arranged to control supply of power to each associated power domain, and wherein the plurality of power controllers are arranged in a hierarchical arrangement comprising two or more hierarchical levels; wherein: a given power controller at a given hierarchical level is arranged to implement a reset procedure requiring a reset to be performed in a given reset domain, where that given reset domain comprises at least a subset of the components provided in multiple power domains associated with multiple power controllers provided in at least one hierarchical level below the given hierarchical level; the given power controller is arranged to initiate the reset procedure by issuing a reset entry request for receipt by each of the multiple power controllers; each power controller amongst the multiple power controllers is arranged, on accepting the reset entry request, to perform a reset preparation procedure in respect of each associated power domain within the multiple power domains to ensure that that associated power domain is in a state that is ready for the reset to be performed in the given reset domain, and to issue a response signal to confirm that the reset preparation procedure has been performed; and the given power controller is arranged, in response to detecting that the response signal has been issued by each of the multiple power controllers, to assert a reset signal to the multiple power domains providing components of the given reset domain in order to cause the reset to be performed in a synchronised manner in respect of all of the components in the given reset domain.

In another example arrangement, there is provided a method of controlling a reset procedure requiring a reset to be performed in a given reset domain of a system, comprising: providing within the system a plurality of power domains, each power domain comprising a plurality of components; providing a plurality of power controllers, wherein each power controller has at least one associated power domain and is arranged to control supply of power to each associated power domain, and wherein the plurality of power controllers are arranged in a hierarchical arrangement comprising two or more hierarchical levels; employing a given power controller at a given hierarchical level to implement the reset procedure for the given reset domain, where the given reset domain comprises at least a subset of the components provided in multiple power domains associated with multiple power controllers provided in at least one hierarchical level below the given hierarchical level; initiating the reset procedure by issuing from the given power controller a reset entry request for receipt by each of the multiple power controllers; performing, at each power controller amongst the multiple power controllers on accepting the reset entry request, a reset preparation procedure in respect of each associated power domain within the multiple power domains to ensure that that associated power domain is in a state that is ready for the reset to be performed in the given reset domain, and issuing a response signal to confirm that the reset preparation procedure has been performed; and in response to detecting that the response signal has been issued by each of the multiple power controllers, asserting from the given power controller a reset signal to the multiple power domains providing components of the given reset domain in order to cause the reset to be performed in a synchronised manner in respect of all of the components in the given reset domain.

In a still further example arrangement, there is provided a system comprising: a plurality of power domains, each power domain comprising a plurality of components; and a plurality of power control means, wherein each power control means has at least one associated power domain and is for controlling supply of power to each associated power domain, and wherein the plurality of power control means are arranged in a hierarchical arrangement comprising two or more hierarchical levels; wherein: a given power control means at a given hierarchical level is arranged to implement a reset procedure requiring a reset to be performed in a given reset domain, where that given reset domain comprises at least a subset of the components provided in multiple power domains associated with multiple power control means provided in at least one hierarchical level below the given hierarchical level; the given power control means for initiating the reset procedure by issuing a reset entry request for receipt by each of the multiple power control means; each power control means amongst the multiple power control means for performing, on accepting the reset entry request, a reset preparation procedure in respect of each associated power domain within the multiple power domains to ensure that that associated power domain is in a state that is ready for the reset to be performed in the given reset domain, and for issuing a response signal to confirm that the reset preparation procedure has been performed; and the given power control means for asserting, in response to detecting that the response signal has been issued by each of the multiple power control means, a reset signal to the multiple power domains providing components of the given reset domain in order to cause the reset to be performed in a synchronised manner in respect of all of the components in the given reset domain.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
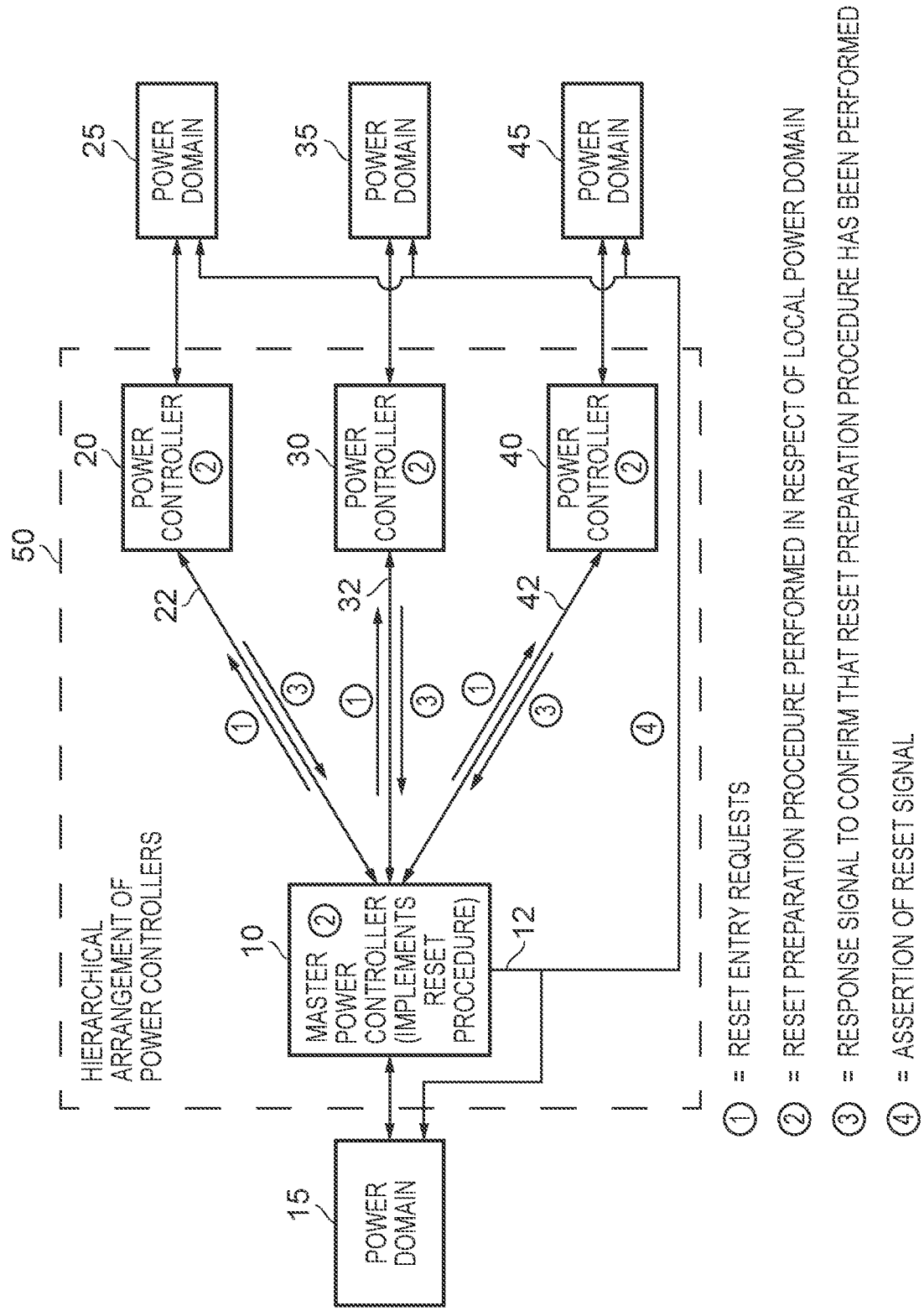
FIG. 1 is a block diagram of a system in accordance with one example arrangement.

In one example implementation a system is provided that comprises a plurality of power domains, where each domain comprises a plurality of components. In addition, a plurality of power controllers are provided, where each power controller has at least one associated power domain and is arranged to control supply of power to each associated power domain. It should be noted that whilst in one example implementation there may be a separate power controller for each power domain, in some implementations one power controller may be associated with more than one power domain, and hence be used to control the supply of power to more than one power domain.

In accordance with the techniques described herein, the plurality of power controllers are arranged in a hierarchical arrangement comprising two or more hierarchical levels. Further, a given power controller at a given hierarchical level is arranged to implement a reset procedure requiring a reset to be performed in a given reset domain. The given reset domain comprises at least a subset of the components provided in multiple power domains associated with multiple power controllers provided in at least one hierarchical level below the given hierarchical level. It is also the case that the given reset domain may additionally comprise at least a subset of the components provided in a power domain associated with the given power controller. In any particular power domain having components within the given reset domain, it may be that all of the components in that power domain are within the given reset domain, or that only a subset of the components within that power domain are within the given reset domain and hence only some of the components in that power domain need to be subjected to the reset procedure.

Rather than all of the various power controllers associated with the power domains having components in the reset domain being arranged to independently perform the required reset, the performance of the reset procedure is coordinated by the given power controller. In particular, the given power controller is arranged to initiate the reset procedure by issuing a reset entry request for receipt by each of the multiple power controllers. Each power controller amongst the multiple power controllers is then arranged, on accepting the reset entry request, to perform a reset preparation procedure in respect of each associated power domain within the multiple power domains to ensure that that associated power domain is in a state that is ready for the reset to be performed in the given reset domain. In particular, it is important to ensure that there is no unintended loss of state as a result of performing the reset, and that any components that are not being reset will continue to function correctly after the reset. Hence, purely by way of example, it may be necessary to store data from a buffer to memory as part of the reset preparation procedure to ensure that that data is not lost when the reset is performed. It may also be necessary for certain components to transition into a stable idle state before the reset is performed, and again such steps will be performed as part of the reset preparation procedure.

Once a power controller has performed the reset preparation procedure in response to the reset entry request, it is then arranged to issue a response signal back to the given power controller to confirm that the reset preparation procedure has been performed. The given power controller is then arranged, once it has detected that the response signal has been issued by each of the multiple power controllers, to assert a reset signal to the multiple power domains providing components of the given reset domain. Hence, the given power controller waits to receive confirmation that the required reset preparation procedure has been performed by the multiple power controllers (and additionally will wait until any required reset preparation procedure has been performed in respect of components in its own power domain if such components are also part of the given reset domain). It may also in some implementations be necessary for the reset preparation procedure to be performed in respect of one or more components that are on the boundary of the reset domain and need subjecting to the reset preparation procedure in order to isolate the reset domain. Once it is confirmed that the reset preparation procedure has been performed in respect of all of the relevant components, then the given power controller can directly control performance of the reset in all of the multiple power domains. In particular, it can directly assert the reset signal to those multiple power domains in order to cause the reset to be performed in a synchronised manner in respect of all of the components in the given reset domain.

By such an approach, this avoids the complications that could arise if the reset procedure was performed in a distributed manner by multiple power controllers, and avoids the potential for only a partial reset to be performed.

The above described technique can be utilised in a variety of different systems that may be implemented using various techniques. The system may for example take the form of an integrated circuit in which the various power domains are provided. As another example, the system could be implemented as a field programmable gate array (FPGA).

The multiple power controllers that the given power controller issues a reset entry request to may in one example implementation be at a same hierarchical level below the given hierarchical level. In one particular example implementation the hierarchical arrangement may merely consist of two hierarchical levels, with the given power controller being at the upper hierarchical level, and all of the multiple power controllers being at the lower hierarchical level. Alternatively, there could be more than two hierarchical levels, but it may be the case that for the given reset domain in question, an intermediate power controller can act as the given power controller, and all of the multiple power controllers that it sends reset entry requests to are at the same lower hierarchical level below the hierarchical level of the given power controller.

In another example implementation, at least one of the multiple power controllers may be at a different hierarchical level to the hierarchical level of at least one other of the multiple power controllers. Hence, purely by way of example, the given power controller may be at a highest hierarchical level, at least one of the multiple power controllers may be at an intervening hierarchical level, and others of the multiple power controllers may be at a lowest hierarchical level.

It is also possible that a power controller at an intervening hierarchical level may itself need to propagate on the reset entry request to at least one power controller at a lower hierarchical level. Hence, the reset entry request may be propagated from the given power controller to at least one of the multiple power controllers via at least one intervening power controller at a hierarchical level between the given hierarchical level and the hierarchical level of the at least one of the multiple power controllers. It may be the case that the intervening power controller itself needs to perform certain steps in respect of its associated power domain in response to the received reset entry request, but in addition may need to propagate the reset entry request on to at least one lower level power controller. In this latter instance, the intervening power controller may be arranged to await receipt of the response signal from that lower level power controller once the lower level power controller has completed the reset preparation procedure, before itself being in a position to propagate a response signal back to the given power controller.

In some instances it may be the case that the intervening power controller needs to perform no steps in respect of its own associated power domain, but merely needs to propagate the reset entry request on to one or more lower level power controllers. In that case, the intervening power controller may still be arranged to await receipt of the response signals from the various lower level power controllers that it has propagated the reset entry request on to, before itself providing a response signal back to the given power controller.

The manner in which the reset entry requests are issued to each of the multiple power controllers may vary dependent on implementation. For example, in one implementation the reset entry requests are issued in parallel for receipt by each of the multiple power controllers. However, in an alternative implementation at least a subset of the reset entry requests may be issued sequentially for receipt by respective power controllers amongst the multiple power controllers.

In some example implementations, a power controller that receives a reset entry request from the given power controller may be obliged to respond to that reset entry request within a given period of time, and may not be allowed to reject the request. However, in an alternative implementation, at least the first time a reset entry request is issued to a power controller by the given power controller during implementation of a particular reset procedure, the recipient power controller may be able to reject the reset entry request under certain conditions. For example, components in its associated power domain may be in the process of handling an interrupt or performing some other important function, and it may be necessary for that function to complete before the power controller can take the required steps in respect of its associated power domain to perform the reset preparation procedure. In such instances, it may be allowed for the power controller to issue a reject signal rejecting the reset entry request.

In such situations, the given power controller may be arranged to be responsive to detecting that a reject signal has been issued by one or more of the multiple power controllers, to re-issue the reset entry request for receipt by at least each power controller that has issued the reject signal, with assertion of the reset signal to the multiple power domains providing components of the given reset domain being deferred until detection that the response signal has been issued by each of the multiple power controllers. Hence, in such situations, the given power controller may be arranged to reissue one or more times the reset entry request, and whilst such steps are being taken no assertion of the reset signal to the multiple power domains will occur.

In one example implementation, any power controller that has accepted the reset entry request, performed the required reset preparation procedure and then issued a response signal, may not need to reperform the reset preparation procedure, since the associated power domain will be retained in the state where it is ready for the reset to be performed until after the reset signal has been asserted, and the reset hence performed.

However, in an alternative implementation, whilst the above approach may be used to accommodate mere delays in the handling of reset entry requests in one or more power domains, once a reject signal has been received from a power controller, the given power controller is arranged to rewind back to the beginning of the reset procedure by releasing each of the multiple power controllers from the reset preparation procedure, and then subsequently retrying the reset procedure again from scratch. This can avoid potential deadlock scenarios arising. For instance, there may be dependencies amongst certain power domains, so that for example if one power domain has been subjected to the reset preparation procedure before another power domain completes the reset preparation procedure this may prevent that other power domain being able to complete the reset preparation procedure, for example by preventing it draining its content, or finishing a current activity.

In order to avoid any particular power controller continuing to reject a reset entry request, then the given power controller may be arranged to mark a reissued reset entry request to indicate to the recipient power controller that the reissued reset entry request is of a higher priority than the originally issued reset entry request. Indeed, at some point, the given power controller may be arranged to mark the reissued reset entry request by allocating it a request type that prohibits the recipient power controller from rejecting the reissued reset entry request. As discussed earlier, in an alternative implementation even the initially issued reset entry request may be marked in such a way, so that the reset entry requests cannot be rejected.

The reset procedure can take a variety of forms. However, in one example implementation the reset procedure is a warm reset procedure associated with a debug operation and the given reset domain excludes those components in each of the multiple power domains maintaining state referenced during the debug operation. Hence, in such an implementation it will typically be the case that there will be a number of components in each power domain that are not being subjected to the reset procedure.

Once the reset has been performed, there are a number of ways in which the system may be arranged to exit the reset state. In one example implementation, following performance of the reset of the given reset domain, the given power controller is arranged to issue, for receipt by each of the multiple power controllers, a reset exit request. Each power controller amongst the multiple power controllers is then arranged, on receiving the reset exit request, to perform a reset exit procedure in respect of the associated power domain to return the components in the associated power domain to a normal functional mode.

The exact timing at which the reset exit request is issued to each of the multiple power controllers may vary dependent on implementation. For instance, in one example implementation it may be the case that it is guaranteed that the reset will have been performed within a certain number of clock cycles of the reset signal being asserted, and accordingly following elapse of that number of clock cycles the given power controller may be arranged to issue the reset exit request to each of the multiple power controllers. In an alternative implementation, the given power controller may be arranged to expect receipt of an acknowledgement signal indicating that the reset has been performed in each of the power domains that the reset signal is asserted to, and accordingly may await receipt of all of the relevant acknowledgement signals before issuing the reset exit request. In a still further example, it may be possible that certain actions can be taken whilst the system is still in the reset state following performance of the reset, and that the reset exit request may only be issued after those actions have been undertaken. For example, it may be possible to perform some debug activity whilst the system is in the warm reset state.

As discussed earlier, in one example implementation, once a power controller amongst the multiple power controllers has issued the response signal, the associated power domain for that power controller is inhibited from exiting the state that is ready for the reset to be performed until after receipt of the reset exit request.

In one example implementation, in addition to issuing the reset entry request to each power controller having an associated power domain containing at least one component of the given reset domain, the given power controller is further arranged to issue the reset entry request to at least one power controller having an associated power domain with at least one component external to the given reset domain but which needs to be subjected to the reset preparation procedure. Similarly, when performing reset exit, the given power controller may be further arranged to issue the reset exit request to at least one power controller having an associated power domain with at least one component external to the given reset domain but which needs to be subjected to the reset exit procedure.

Particular examples will now be described with reference to the Figures.

FIG. 1 illustrates a system in accordance with one example implementation. The system can be implemented in a variety of ways, for example as an integrated circuit, or as an FPGA. The various components forming the system are provided within multiple power domains 15, 25, 35, 45, and for each power domain there is an associated power controller 10, 20, 30, 40. Whilst in FIG. 1 there is a separate power controller for each power domain, in an alternative implementation it may be the case that a single power controller is provided in association with more than one power domain. The power controllers 10, 20, 30, 40 are used to control the supply of power to their associated power domains 15, 25, 35, 45. Whilst the power controllers may be arranged so that they can perform certain actions independently of the actions performed by other power controllers, a particular issue that can arise is how to coordinate certain types of reset activities. In particular, it may be desired to perform a reset in respect of a reset domain, where that reset domain has components in multiple of the power domains associated with multiple power controllers. For example, it may be that the given reset domain in question has components in the power domains 15, 25 and 45, and accordingly when performing a reset in respect of that reset domain, this will require steps to be taken by each of the associated power controllers 10, 20, 40. However, if the various power controllers 10, 20, 40 are allowed to operate independently when taking the steps required to perform a reset of the reset domain, this can cause a number of problems. For example, by performing the reset in a distributed manner using multiple power controllers, this could cause long transitional system states. Further, there is the potential that only a partial reset of the reset domain may occur, and this could lead to instability within the system and potentially a loss of data.

In order to alleviate such issues, in accordance with the techniques described herein the various power controllers are arranged in a hierarchical arrangement 50 that comprises two or more hierarchical levels. The reset procedure required in respect of a given reset domain is then coordinated by a given power controller at a level above the lowest level in the hierarchy, this given power controller also being referred to herein as a master power controller for the given reset domain.

In the example shown in FIG. 1, there are only two hierarchical levels, and the master power controller takes the form of the power controller 10. However, there is no requirement for there to be only two hierarchical levels in the hierarchical arrangement, and in some instances there may be three or more hierarchical levels. The level at which the master power controller is positioned may vary dependent on the given reset domain, and in particular which power domains contain components within that given reset domain.

FIG. 1 schematically illustrates the steps performed in order to coordinate the reset procedure required in respect of the given reset domain. In this particular example, it is assumed that the given reset domain comprises components in each of the four power domains illustrated in FIG. 1. The master power controller 10 is arranged to initiate the reset procedure by issuing a reset entry request to each of the other power controllers that are associated with power domains containing at least one of the components of the given reset domain. These reset entry requests are hence issued to each of the power controllers 20, 30, 40 over the associated signal paths 22, 32, 42.

It should be noted that in some instances the reset entry request may also be sent to a power controller having an associated power domain that does not include components of the reset domain. For example a power domain may include components that are on the boundary of the reset domain and which may need subjecting to the reset preparation procedure in order to isolate the reset domain.

It may also be necessary in some instances to issue the reset entry requests in a certain order, rather than simultaneously to each power controller, so as to avoid potential deadlock scenarios and to avoid rejection of reset entry requests.

On accepting a reset entry request, each power controller 20, 30, 40 performs a reset preparation procedure in respect of its associated power domain 25, 35, 45 in order to ensure that the associated power domain is in a state that is ready for the reset to be performed in the given reset domain. As discussed earlier, by performing the reset preparation procedure, the aim is to ensure that there is no unintended loss of state as a result of performing the reset, and may involve a variety of steps, such as storing data from a buffer to memory to ensure that the data is not lost, and causing certain components in the associated power domain to enter into a stable idle state before the reset is performed.

In situations where the given reset domain also includes components in the power domain 15, the master power controller 10 may itself perform the reset preparation procedure in respect of its associated power domain.

Once each power controller 20, 30, 40 has performed the required reset preparation procedure, it is arranged to issue a response signal back to the master power controller 10 over its associated signal path 22, 32, 42. Once the master power controller 10 has received the response signal from each power controller that it has issued the reset entry request to, and the master power controller has performed any required reset preparation procedure in respect of its own power domain, then the master power controller knows that all of the power domains that have one or more components of the given reset domain are in a stable state where the reset can be applied. Accordingly, at that point, the master power controller 10 is arranged to assert a reset signal over path 12 to each of the multiple power domains that provide components of the given reset domain. As a result, the reset is performed in a synchronised manner in respect of all of the components of the given reset domain.

The reset entry requests may be arranged so that they cannot be rejected by the power controllers that they are issued to, and instead need to be processed within a certain predetermined period of time. However, in an alternative implementation, it may be possible, at least in respect of an initial reset entry request sent to a power controller, for that power controller to reject the reset entry request under certain situations. For example, if may be that components in the associated power domain are in the middle of performing a task that needs to be completed before the reset preparation procedure can be implemented, and hence under those conditions it may be that a power controller can reject a reset entry request. The master power controller 10 may then be arranged to respond to receipt of such a reject signal by subsequently reissuing the reset entry request to the power controller that rejected the previous instance of that reset entry request. If desired, the master power controller may change the priority of the subsequently issued reset entry request to indicate that it is of a higher priority than the original reset entry request, and may even change the type of the reset entry request to a type that cannot be rejected by the recipient power controller.

It should be noted that once a power controller has completed the reset preparation procedure in respect of its associated power domain and issued the response signal to the master power controller 10, then that associated power domain will be retained within the state where it is ready for the reset to be performed, and hence even if there is a delay in receiving a response signal from one of the power controllers, the reset preparation procedure performed by any of the other power controllers will not need to be re-performed. However, whilst in one example implementation this approach is used to handle mere delays in handling the reset entry requests within certain power domains, a different approach is taken if a reset entry request is rejected. In particular, if a reject signal is issued, then the given power controller may be arranged to rewind back to the beginning of the reset procedure by releasing each of the multiple power controllers from the reset preparation procedure, and then subsequently retrying the reset procedure again from scratch. As mentioned earlier, this can avoid potential deadlock scenarios arising. In particular, without such an approach, functional dependencies between power domains may mean that reissued reset entry requests only targeting a subset of the relevant power controller may never complete.

Figure 2:
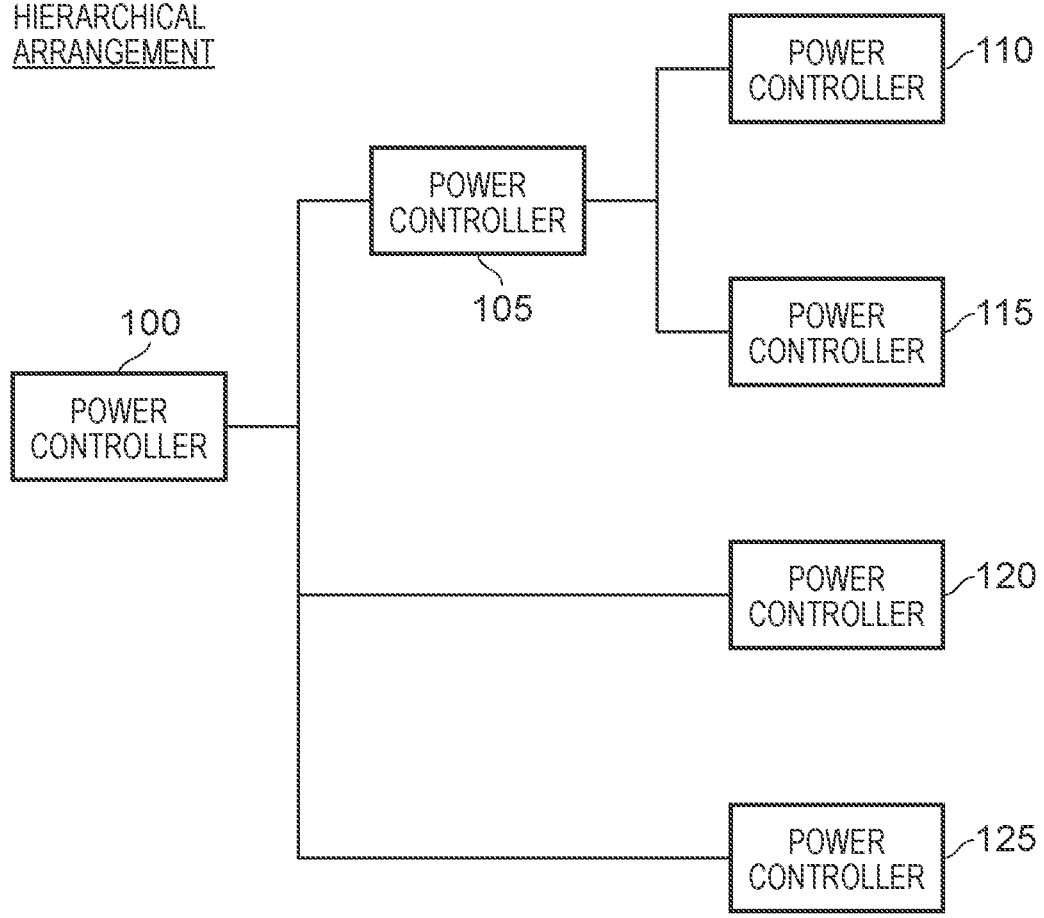
FIG. 2 illustrates an alternative hierarchical arrangement of power controllers to the arrangement shown in FIG. 1, that may be used in one example implementation.

As mentioned earlier, there is no requirement for the hierarchical arrangement of power controllers 50 to comprise only two hierarchical levels. Purely by way of example, FIG. 2 illustrates an alternative arrangement of power controllers that could for example be used in a different implementation. Hence, in this example there is one power controller 100 at the highest hierarchical level, another power controller 105 at an intermediate hierarchical level, and four power controllers 110, 115, 120, 125 at the lowest hierarchical level. Each power controller may have at least one associated power domain, and is used to control the supply of power to that associated power domain.

In one example scenario, the power controller 100 may be the master power controller that controls performance of the reset procedure in respect of the given reset domain, and in that instance may be arranged to issue the reset entry request to the power controllers 105, 120, 125. Here, it is assumed that the given reset domain includes some components in at least the power domains associated with the power controllers 120, 125, and within one or more of the power domains associated with the group of power controllers 105, 110, 115.

With regards to the reset entry request sent to the power controller 105, the given reset domain may be predetermined, or alternatively sufficient information may be provided within the reset entry request for the power controller 105 to determine which of the power domains associated with it, and with the lower level power controllers 110, 115, have components within the given reset domain. Where the given reset domain includes components within one or more power domains associated with the power controllers 110, 115, the power controller 105 may be arranged to propagate on the reset entry request to those power controllers 110, 115, so that those power controllers can undertake the reset preparation procedure in respect of their associated power domains. Where the reset domain also includes components within a power domain managed by the power controller 105, the power controller 105 will itself perform the reset preparation procedure in respect of its associated power domain.

In situations where the power controller 105 has propagated on a reset entry request to one or both of the power controllers 110, 115, it will await receipt of the response signal from those power controllers before itself returning a response signal to the master power controller 100. Hence, by the time the power controller 105 issues a response signal to the master power controller 100, this will identify that the reset preparation procedure has been performed in respect of all of the required components in the power domains associated with the power controller 105 and the power controllers 110, 115.

In situations where a reject signal is issued by either the power controller 110 or the power controller 115, the power controller 105 may be arranged to act in a variety of ways. For example, it could in one implementation be arranged itself to reissue the reset entry request back to the power controller 110, 115 that rejected the previous reset entry request. However, in one example implementation, it is only the master power controller that undertakes steps to reissue the reset entry request, and accordingly if a reject signal is received by either of the power controllers 110, 115, the power controller 105 will itself issue a reject signal back to the master power controller 100.

In situations where there are multiple hierarchical levels, then the power controller that undertakes the role of the master power controller may depend on which power domains contain components within the given reset domain that is to be reset. Hence, purely by way of example, if a particular reset domain that needs to be subjected to the reset procedure only contains components within the power domains controlled by the power controllers 105, 110, 115, then the power controller 105 may itself form the master power controller, and will issue reset entry requests to the power controllers 110, 115, collate the responses, and then control the assertion of the reset signal to the relevant power domains.

Figure 3:
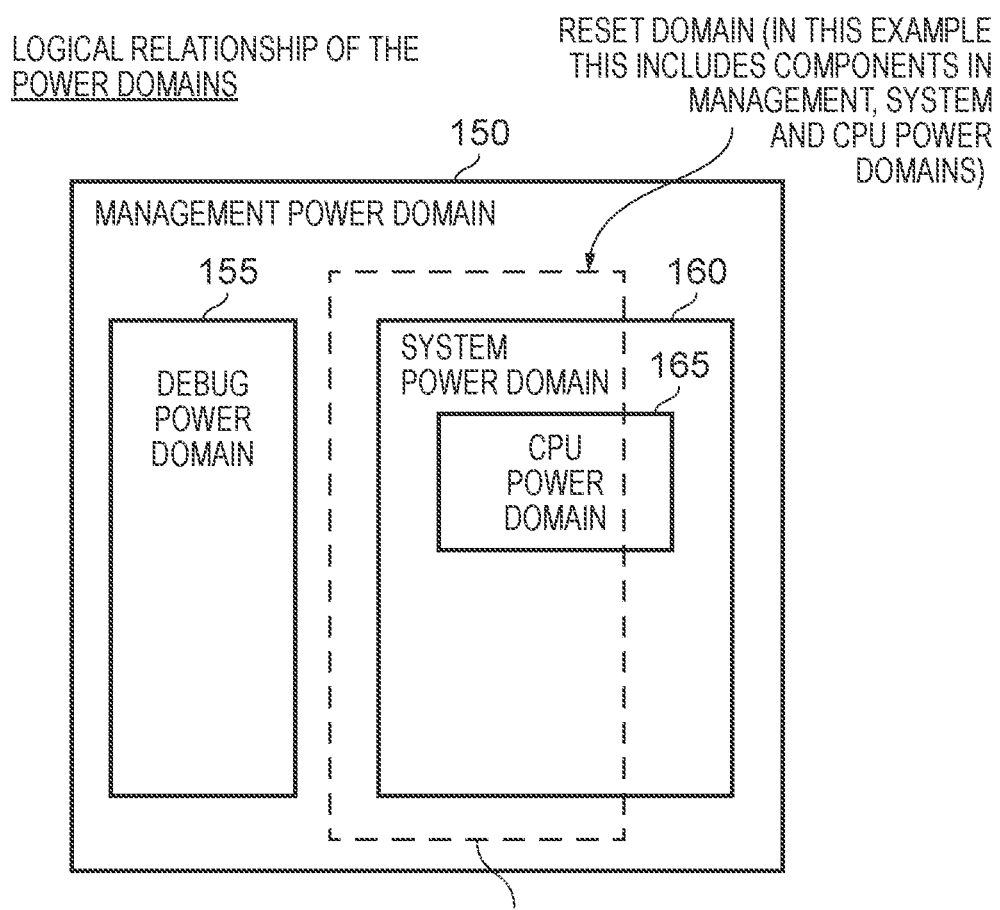
FIG. 3 illustrates the logical relationship of power domains in one example implementation, and indicates how a reset domain may include components in multiple power domains.

FIG. 3 is a diagram schematically illustrating the logical relationship of power domains within a particular example system. In this example system, there is a management power domain 150 that may be considered to logically incorporate a debug power domain 155 and a system power domain 160. The system power domain 160 may itself be logically considered to incorporate a number of other power domains such as a CPU power domain 165.

Such a diagram is useful for illustrating the relationship between power domains and reset domains. In particular, it may be that a reset domain 170 is defined, such that a reset procedure may need to be applied in respect of the components within that reset domain. As is apparent from FIG. 3, in the particular example shown, this reset domain will include components in various power domains, in particular, the management power domain 150, the system power domain 160 and the CPU power domain 165.

Whilst FIG. 3 illustrates the logical relationship of the power domains, as discussed earlier, in the systems described herein, individual power domains may have associated power controllers and as a result a CPU power controller may be provided in association with the CPU power domain 165, and a system power controller may be associated with the system power domain 160 for controlling those components of the system power domain that are not within the CPU power domain 165. Similarly, a debug power controller may be associated with the debug power domain 155 for controlling the supply of power to the components within the debug power domain. Further, a management power controller may be associated with the management power domain 150, and is used to control the supply of power to the components within the management power domain that do not themselves fall within one of the lower level power domains controlled by their own separate power controllers. Hence, other than when discussing the logical relationship in FIG. 3, the power domains will be identified herein with reference to the power controllers that control provision of power to them.

Figure 4:
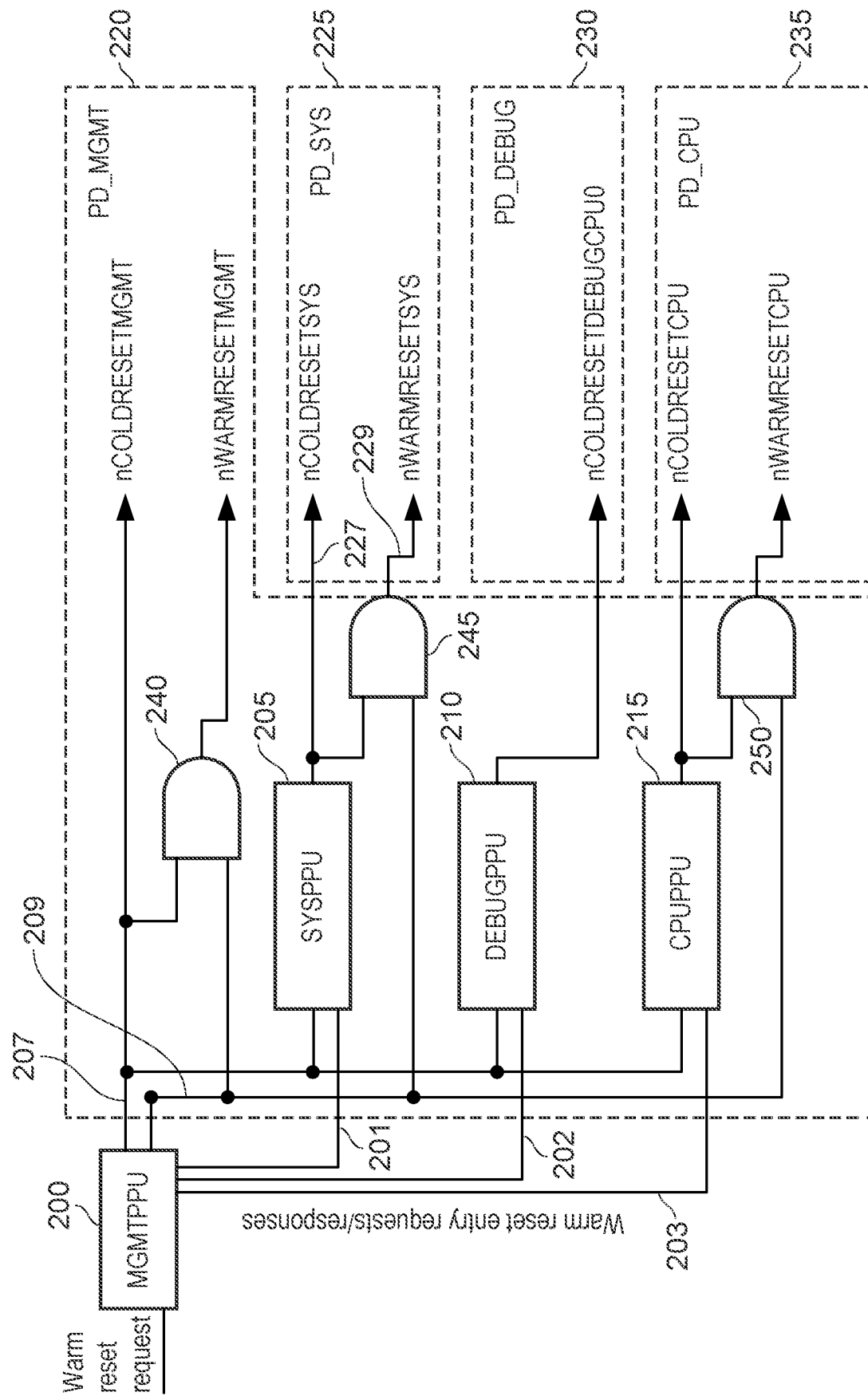
FIG. 4 schematically illustrates how power controllers may be interconnected in one particular example implementation.

FIG. 4 hence illustrates the relationship between the various power controllers and the associated power domains that those power controllers control the supply of power to. FIG. 4 also illustrates the hierarchical relationship between the various power controllers in this example implementation.

In this example, the hierarchical arrangement of power controllers contains two hierarchical levels. At the highest hierarchical level, a management power controller 200 is provided, in FIG. 4 the power controllers also being referred to as power policy units (PPUs).

The management PPU 200 is used to control the supply of power to the associated management power domain 220, this being formed of the components of the system that are not within one of the underlying power domains. As shown in FIG. 4, amongst other components, the power management domain 220 will include a system PPU 205 used to control the supply of power to the system power domain 225, a debug PPU 210 used to control supply of power to the debug power domain 230 and a CPU PPU 215 used to control the supply of the power to the CPU power domain 235.

As shown in FIG. 4, two types of reset are supported within the system. The first type of reset is a cold reset. A cold reset may for example be applied when a power domain is first turned on, and is typically applied to all of the components within the associated power domain. It may for example cause all sequential elements to start operating from a specified state. There is no requirement for global coordination when applying cold resets to particular power domains, and hence (whilst a global cold reset signal may be asserted over path 207) each of the individual PPUs 200, 205, 210, 215 may be able in one example implementation to independently perform cold reset operations in relation to their associated power domains 220, 225, 230, 235.

In the example of FIG. 4, assertion of the reset signals is at a logic low value, and the AND gates 240, 245, 250 are used in association with those power domains that also support a warm reset operation, in order to ensure that a cold reset signal is asserted to all of the components within the associated power domain. Hence, considering for example the system power domain 225, when a cold reset is applied, this is applied to all of the components within the system power domain 225. A subset of those components may be associated with a warm reset domain, whilst the other components are only subjected to a cold reset. For these latter components, a cold reset signal can be asserted directly from the system PPU 205 by setting a logic zero value over path 227. In addition, the asserted logic zero value will be provided as a first input to the AND gate 245 and accordingly will cause a logic zero value to be asserted over path 229, thereby ensuring that all components within the system power domain are subjected to the cold reset operation.

However, another type of reset that is supported is referred to herein as a warm reset, and it is in connection with the warm reset procedure that the techniques described herein are employed. In the examples described herein the warm reset is associated with debugging activity, and it is used to apply a reset in respect of a given reset domain prior to then performing a debug operation. As per the example shown in FIG. 3, the given reset domain 170 may actually include components in multiple of the power domains, in this particular example components in the management power domain, the system power domain and the CPU power domain. In the example of FIG. 4, the warm reset is not applied in respect of any components within the debug power domain, and accordingly no logic is provided to facilitate application of a warm reset to the debug power domain 230.

In accordance with the techniques described herein, communication paths 201, 202, 203 are provided between the management PPU 200 and the system PPU 205, the debug PPU 210 and the CPU PPU 215, respectively. When a warm reset request is received by the management PPU 200, it is arranged to initiate the required warm reset procedure by issuing the earlier discussed reset entry requests over the communication paths 201, 202, 203 to the system PPU 205, debug PPU 210 and CPU PPU 215. Receipt of the reset entry request ensures that the PPUs 205, 210, 215 do not take any steps which would conflict with the desire to perform a warm reset procedure. In addition, the system PPU 205, debug PPU 210 and the CPU PPU 215 will then initiate a reset preparation procedure in respect of their associated power domains 225, 230, 235 in order to ensure that the components of the associated power domains are in a state that is ready for the reset to be performed. It is noted here that although the debug power domain 230 does not include components in the warm reset domain, and hence will not in due course be subjected to the warm reset, it does include components that need to be placed into a state ready for the warm reset to be applied to the warm reset domain. For example, some access control gates in the debug power domain 230 may be closed as part of the reset preparation procedure to make sure that no access is made from the debugger to the reset domain that is to be warm reset.

In some implementations there may be dependencies between components in the powers domains 225, 230, 235, and as a result the reset entry requests may have to be issued in turn (and not simultaneously) in order to avoid deadlocks and avoid denials. In one particular example implementation, first the debug PPU 210 is sent the reset entry request, and later the system and CPU PPUs 205, 215 are sent the reset entry request. In particular the system and CPU PPUs may be sent the reset entry request after the debug PPU's response signal is received, in order to guarantee the proper order of performance of the reset preparation procedure by the power controllers 205, 210, 215.

Once the required reset preparation steps have been taken, each PPU 205, 210, 215 will then issue response signals back to the management PPU 200 over the communication paths 201, 203. Once the management PPU 200 has received all of the required responses, it then knows that all of the components associated with the warm reset domain are in a stable state, and accordingly can assert over path 209 a warm reset signal for application to each of the affected power domains, in this case the management power domain 220, the system power domain 225 and the CPU power domain 235. As with the cold reset signal asserted over path 207, the warm reset signal is asserted at a logic zero value. Accordingly, by application of the logic zero value to the lower input of each AND gate 240, 245, 250, the warm reset is asserted within each of the three power domains 220, 225, 235 in a coordinated manner, thus ensuring a reliable application of the warm reset procedure in respect of the warm reset domain.

There are a number of ways in which the system may be arranged to exit the reset state following assertion of the warm reset signal over path 209. In one example implementation, the assertion of the warm reset signal will itself clear the warm reset request provided to the management PPU 200, and on clearing of the warm reset request the management PPU will de-assert the warm reset on the signal path 209, and then issue a reset exit request to the power controllers 205, 210, 215 via paths 201, 202, 203. This will cause the recipient power controllers to perform a reset exit procedure in respect of the associated power domain to return the components in the associated power domain to a normal functional mode.

In an alternative implementation, it may be that the warm reset request received by the management PPU 200 stays asserted for a period of time, even after the warm reset signal has been asserted over path 209. Hence, there could be some gap before the reset exit procedure is invoked following assertion of the warm reset signal. This could for example be useful if there are certain steps that can be taken by the debugger whilst the system is still in the warm reset state.

Figure 5:
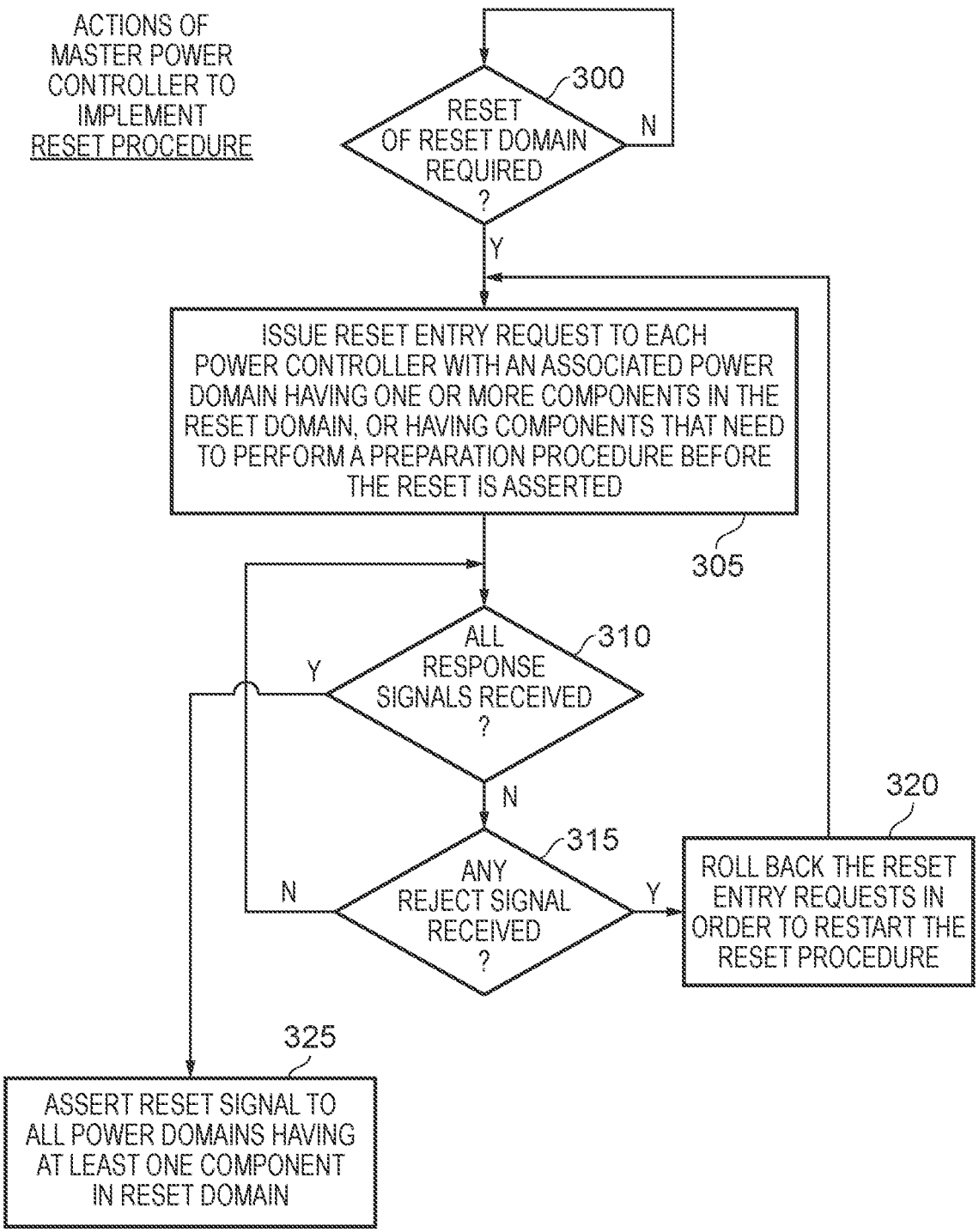
FIG. 5 is a flow diagram illustrating the actions of a master power controller when implementing a reset procedure in accordance with one example implementation.

FIG. 5 is a flow diagram illustrating the steps performed by the master power controller in order to implement a reset procedure, in accordance with one example implementation. At step 300, it is determined whether a reset of the reset domain is required. Hence, considering the warm reset domain discussed earlier, it will be determined at step 300 whether the warm reset request is asserted to the management PPU 200.

When the warm reset request is asserted, then the process proceeds to step 305 where a reset entry request is issued to each power controller with an associated power domain having one or more components in the reset domain, or having components that need to perform a preparation procedure before the reset is asserted (as may for example be the case for the debug power domain 230). Hence, in the earlier discussed example this will involve assertion of the reset entry request to the system PPU 205, the CPU PPU 215, and the debug PPU 210 in the example implementation illustrated in FIG. 4.

As discussed earlier, on receiving the reset entry request, each of the recipient PPUs performs a reset preparation procedure in respect of its associated power domain. As also discussed earlier, it may be that the master power controller, e.g. the management PPU 200, also needs to perform the reset preparation procedure in respect of its associated power domain, due for example to there being one or more components of the warm reset domain that reside within the management power domain 220, or there being one or more components that that may need to take some action to protect the components on cold reset, or hold off accesses during warm reset.

At step 310, the management PPU 200 determines whether all response signals have been received, i.e. whether a response signal has been received from every PPU that the management PPU has issued a reset entry request to.

If not all the response signals have been received, then at step 315 it is determined whether any reject signals have been received. If not, the process loops back to step 310, with the system waiting for either all response signals to be received, or a reject signal to be received.

In the event that a reject signal is detected at step 315, then at step 320 the management PPU 200 is arranged to roll back the reset entry requests in order to restart the reset procedure. The process then returns to step 305 where the reset entry requests are reissued to each of the power controllers. There may optionally be some delay before the reset entry requests are reissued, and as discussed earlier a reissued reset entry request can, if desired, be given a higher priority than the previous reset entry request. Indeed, it may even be arranged to be of a type that prevents further rejection of the reset entry request.

Once at step 310 it is determined that all of the response signals have been received, and assuming any required reset preparation has been performed by the management PPU 200 in respect of the management power domain 220, then the process proceeds to step 325 where the reset signal is asserted to all of the power domains that have at least one component in the reset domain. In the example of FIG. 4, this will involve the management PPU 200 at this point asserting the warm reset signal to each of the management power domain 220, system power domain 225 and CPU power domain 235.

As mentioned earlier, in an alternative implementation it may be the case that the original reset entry request cannot be rejected by the recipient PPUs and need to be processed in a predetermined period of time. In that event, it will be appreciated that steps 315 and 320 are not required.

Figure 6:
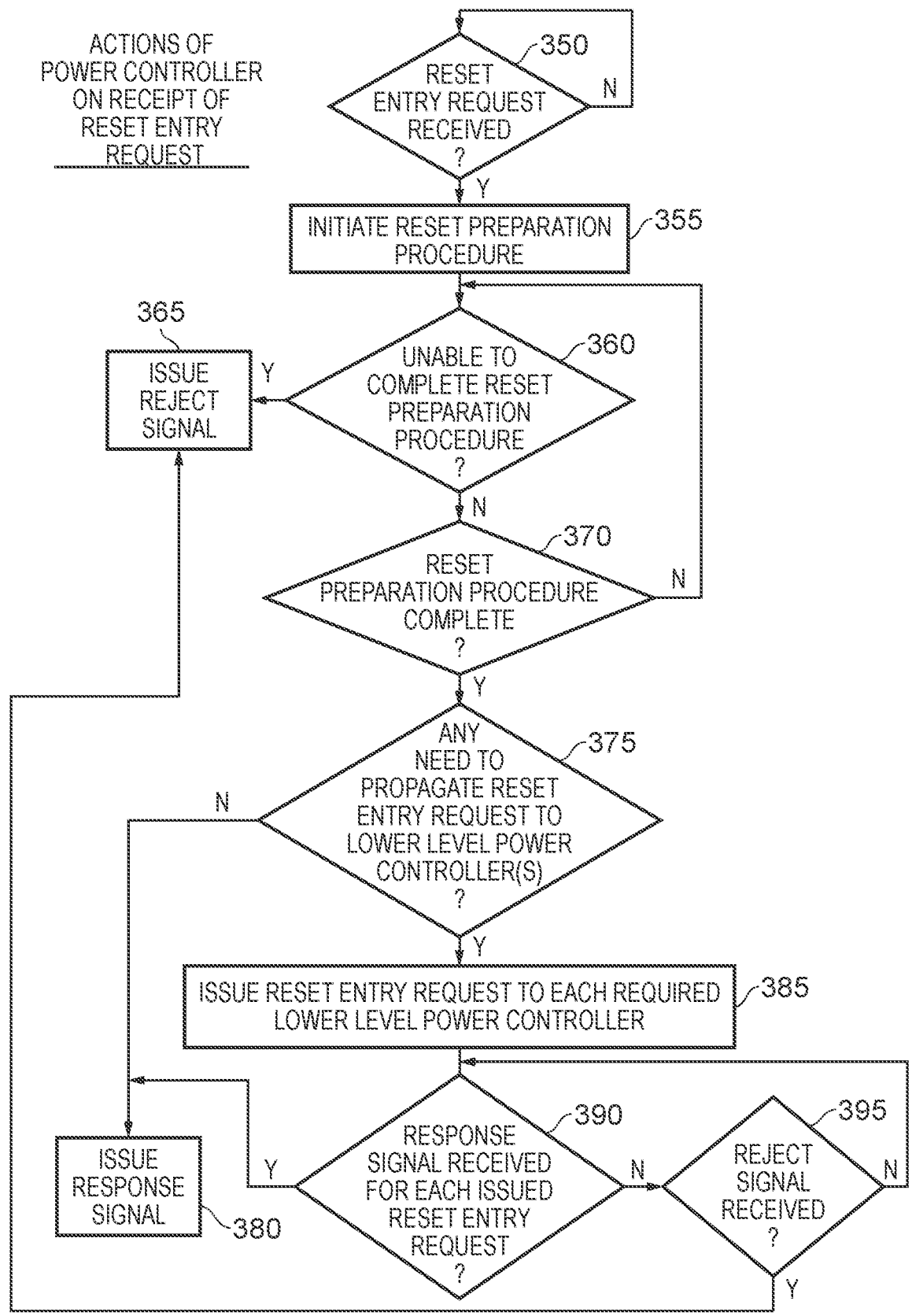
FIG. 6 is a flow diagram illustrating steps performed by a power controller on receipt of a reset entry request, in accordance with one example implementation.

FIG. 6 is a flow diagram illustrating the actions of a recipient power controller on receiving a reset entry request from the master power controller. At step 350, it is determined whether a reset entry request has been received, and if so the reset preparation procedure is initiated at step 355. As discussed earlier, the reset preparation procedure may require a number of steps to be undertaken in respect of certain of the components in the associated power domain, including for example a request for those components to enter into a stable idle state.

At step 360 it is determined whether the recipient power controller is unable to complete the reset preparation procedure. This could for example be the case if one of the components indicates that it is not able to proceed to a stable idle state, for example because it is in the middle of performing a particular task such as the handling of an interrupt or the performance of another high priority routine. In that instance, then the process may proceed to step 365 where the recipient power controller issues a reject signal back to the master power controller. As discussed earlier, this may result in the master power controller in due course reissuing the reset entry request to each power controller, where it will again then be detected at step 350 and the process of FIG. 6 reperformed.

If at step 360 no indication is detected that the reset preparation procedure cannot be completed, then it is determined at step 370 whether the reset preparation procedure has completed. If not, the process loops back to step 360, but when at step 370 it is determined that the reset preparation procedure has been completed, the process proceeds to step 375.

At step 375, it is determined whether there is any need to propagate the reset entry request to a lower level power controller. For example, with reference to the earlier discussed FIG. 2, the power controller 105 may determine that there is a need to issue the reset entry request to one or both of the power controllers 110, 115. If the reset entry request does need to be propagated on to a lower level power controller, then the process proceeds to step 385 where the reset entry request is issued to each required lower level power controller, and then at step 390 it is determined whether a response signal has been received for each issued reset entry request (i.e. for each reset entry request that has been propagated onto a lower level power controller). If not, it is determined at step 395 whether a reject signal is received from any of those lower level power controllers, and if not the process returns to step 390.

In the example shown in FIG. 6, if a reject signal is received at step 395 from one of the lower level power controllers, then rather than the intermediate power controller that receives the reject signal itself deciding to reissue the reset entry request, it instead merely proceeds to step 365 where it issues a reject signal back to the master power controller.

If at step 375 it is determined that there is no need to propagate a reset entry request on to a lower level power controller, or if at step 390 it is determined that the required response signal has been received for any reset entry request issued to a lower level power controller, then the process proceeds to step 380 where a response signal is issued back to the master power controller.

In situations where the power controller performing the process of FIG. 6 is an intervening power controller, such as the power controller 105 shown in FIG. 2, then it may or may not be the case that a reset preparation procedure is required in respect of the associated power domain of that intervening power controller. For example, whilst in some instances that intervening power controller may be associated with a power domain that itself includes components of the warm reset domain, this is not a requirement and it may be that the intervening power controller 105 merely needs to propagate the reset entry request on to one or more lower level controllers 110, 115. In that event, steps 355 to 370 can be omitted, and the intervening power controller will merely proceed directly to step 375 where it will determine that it is necessary to propagate on the reset entry request to one or more lower level power controllers.

Figure 7:
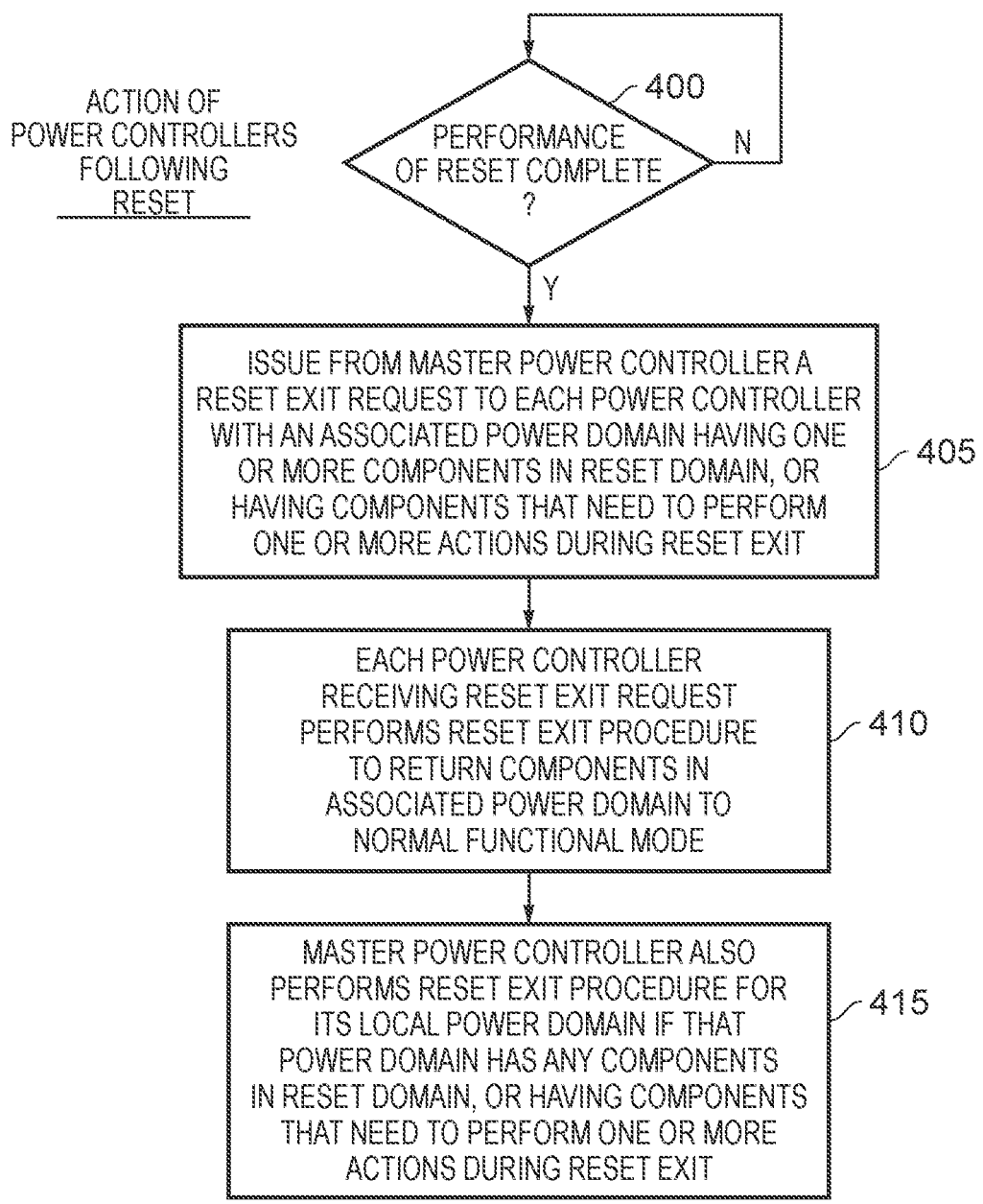
FIG. 7 is a flow diagram illustrating steps performed following performance of a reset, in accordance with one example implementation.

FIG. 7 is a flow diagram illustrating steps performed by the power controllers following assertion of the reset by the master power controller. At step 400, it is determined whether performance of the reset is complete. The master power controller can assess this in a number of ways. For example, the system may be arranged so that it can be assumed that the reset procedure is complete a certain number of clock cycles after the master controller has asserted the reset signal to the relevant power domains. In an alternative implementation, it may be that the master power controller will receive an acknowledgement signal in respect of each asserted reset signal, and in that instance will await receipt of the acknowledgement signals before determining that the reset procedure is complete.

Once it is determined that the performance of the reset is complete, the master power controller de-asserts the warm reset and the process proceeds to step 405 where the master power controller then issues a reset exit request to each power controller whose associated power domain has one or more components in the reset domain that has been subjected to the reset procedure, i.e. the warm reset domain in the earlier discussed example, or has one or more components that are not in the warm reset domain but that need to perform one or more actions during reset exit. Whilst in some instances the master power controller may be arranged to issue these reset exit requests immediately following the determination at step 400 that the reset procedure is complete, in an alternative implementation there may be some further delay before the warm reset is de-asserted and the reset exit requests are issued. For example, in some systems it may be the case that some useful debug activity can be performed whilst the system is in the warm reset state, and in those instances that debug activity may occur before it is then determined that the reset exit requests should be issued.

Once the reset exit requests have been issued at step 405, then at step 410 each power controller that receives a reset exit request is arranged to perform a reset exit procedure in order to return the components in the associated power domain to their normal functional mode. In one example implementation, each of the power controllers will then issue an acknowledgement signal back to the master power controller to confirm that the reset exit procedure has been performed.

At step 415, which in one example implementation may be performed in parallel with step 410, the master power controller also performs the reset exit procedure for its local power domain if that power domain has any components that were in the warm reset domain, or has one or more components that are not in the warm reset domain but need to perform one or more actions during reset exit.

The reset exit procedure can take a variety of forms, but in general terms serves to wake up any of the idle components that were placed into the idle state prior to assertion of the warm reset, so that the system can then resume its normal operation.

From the above description, it will be appreciated that the techniques described herein provide an efficient and effective mechanism for synchronising the performance of a warm reset within a warm reset domain that contains components spanning multiple power domains that are associated with multiple power controllers. A master power controller is arranged to implement the reset procedure by communicating with one or more lower level power controllers in order to cause a reset preparation procedure to be performed in respect of the relevant power domains to ensure that those power domains are in a stable state prior to the reset being performed. Once those steps have been undertaken, and the master power controller has received confirmation that those steps have been taken, then the master controller can directly assert a warm reset to the relevant power domains, thereby causing the warm reset to be performed in a synchronised manner. This allows a system to be provided that has separate power controllers for different power domains, but whilst allowing the warm reset procedure to be coordinated in order to ensure the performance of the warm reset occurs in a reliable manner, avoiding long transitional system states, and avoiding the potential for only a partial reset occurring.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A system comprising:
 a plurality of power domains, each power domain comprising a plurality of components; and
 a plurality of power controllers, wherein each power controller has at least one associated power domain and is arranged to control supply of power to each associated power domain, and wherein the plurality of power controllers are arranged in a hierarchical arrangement comprising two or more hierarchical levels;
 wherein:
 a given power controller at a given hierarchical level is arranged to implement a reset procedure requiring a reset to be performed in a given reset domain, where that given reset domain comprises at least a subset of the components provided in multiple power domains associated with multiple power controllers provided in at least one hierarchical level below the given hierarchical level;
 the given power controller is arranged to initiate the reset procedure by issuing a reset entry request for receipt by each of the multiple power controllers;
 each power controller amongst the multiple power controllers is arranged, on accepting the reset entry request, to perform a reset preparation procedure in respect of each associated power domain within the multiple power domains to ensure that that associated power domain is in a state that is ready for the reset to be performed in the given reset domain, and to issue a response signal to confirm that the reset preparation procedure has been performed;
 the given power controller is arranged, in response to detecting that the response signal has been issued by each of the multiple power controllers, to assert a reset signal to the multiple power domains providing components of the given reset domain in order to cause the reset to be performed in a synchronised manner in respect of all of the components in the given reset domain;
 the given power controller is responsive to detecting that a reject signal has been issued by one or more of the multiple power controllers rejecting the reset entry request, to re-issue the reset entry request for receipt by at least each power controller that has issued the reject signal, with assertion of the reset signal to the multiple power domains providing components of the given reset domain being deferred until detection that the response signal has been issued by each of the multiple power controllers; and
 when re-issuing the reset entry request, the given power controller is arranged to mark the re-issued reset entry request to indicate to the recipient power controller that the re-issued reset entry request is of a higher priority than the originally issued reset entry request.

2. A system as claimed in claim 1, wherein:
 each of the multiple power controllers are at a same hierarchical level below the given hierarchical level.

3. A system as claimed in claim 1, wherein the reset entry request is propagated from the given power controller to at least one of the multiple power controllers via at least one intervening power controller at a hierarchical level between the given hierarchical level and the hierarchical level of the at least one of the multiple power controllers.

4. A system as claimed in claim 1, wherein the reset entry requests are issued in parallel for receipt by each of the multiple power controllers.

5. A system as claimed in claim 1, wherein at least a subset of the reset entry requests are issued sequentially for receipt by respective power controllers amongst the multiple power controllers.

6. A system as claimed in claim 1, wherein the given power controller is arranged to mark the reissued reset entry request by allocating it a request type that prohibits the recipient power controller from rejecting the reissued reset entry request.

7. A system as claimed in claim 1, wherein the reset procedure is a warm reset procedure associated with a debug operation and the given reset domain excludes those components in each of the multiple power domains maintaining state referenced during the debug operation.

8. A system as claimed in claim 1, wherein:
following performance of the reset of the given reset domain, the given power controller is arranged to issue, for receipt by each of the multiple power controllers, a reset exit request; and
each power controller amongst the multiple power controllers is arranged, on receiving the reset exit request, to perform a reset exit procedure in respect of the associated power domain to return the components in the associated power domain to a normal functional mode.

9. A system as claimed in claim 8, wherein once a power controller amongst the multiple power controllers has issued the response signal, the associated power domain for that power controller is inhibited from exiting the state that is ready for the reset to be performed until after receipt of the reset exit request.

10. A system as claimed in claim 1, wherein the given reset domain further comprises at least a subset of the components provided in the power domain associated with the given power controller.

11. A system as claimed in claim 1, wherein the given power controller is further arranged to issue the reset entry request to at least one power controller having an associated power domain with at least one component external to the given reset domain but which needs to be subjected to the reset preparation procedure.

12. A system as claimed in claim 8, wherein the given power controller is further arranged to issue the reset exit request to at least one power controller having an associated power domain with at least one component external to the given reset domain but which needs to be subjected to the reset exit procedure.

13. A system as claimed in claim 1, wherein:
at least one of the multiple power controllers is at a different hierarchical level to the hierarchical level of at least one other of the multiple power controllers.

14. A method of controlling a reset procedure requiring a reset to be performed in a given reset domain of a system, comprising:
providing within the system a plurality of power domains, each power domain comprising a plurality of components;
providing a plurality of power controllers, wherein each power controller has at least one associated power domain and is arranged to control supply of power to each associated power domain, and wherein the plurality of power controllers are arranged in a hierarchical arrangement comprising two or more hierarchical levels;
employing a given power controller at a given hierarchical level to implement the reset procedure for the given reset domain, where the given reset domain comprises at least a subset of the components provided in multiple power domains associated with multiple power controllers provided in at least one hierarchical level below the given hierarchical level;
initiating the reset procedure by issuing from the given power controller a reset entry request for receipt by each of the multiple power controllers;
performing, at each power controller amongst the multiple power controllers on accepting the reset entry request, a reset preparation procedure in respect of each associated power domain within the multiple power domains to ensure that that associated power domain is in a state that is ready for the reset to be performed in the given reset domain, and issuing a response signal to confirm that the reset preparation procedure has been performed;
in response to detecting that the response signal has been issued by each of the multiple power controllers, asserting from the given power controller a reset signal to the multiple power domains providing components of the given reset domain in order to cause the reset to be performed in a synchronised manner in respect of all of the components in the given reset domain;
in response to detecting that a reject signal has been issued by one or more of the multiple power controllers rejecting the reset entry request, re-issuing the reset entry request for receipt by at least each power controller that has issued the reject signal, with assertion of the reset signal to the multiple power domains providing components of the given reset domain being deferred until detection that the response signal has been issued by each of the multiple power controllers; and
when re-issuing the reset entry request, marking the re-issued reset entry request to indicate to the recipient power controller that the re-issued reset entry request is of a higher priority than the originally issued reset entry request.

15. A system comprising:
a plurality of power domains, each power domain comprising a plurality of components; and
a plurality of power control means, wherein each power control means has at least one associated power domain and is for controlling supply of power to each associated power domain, and wherein the plurality of power control means are arranged in a hierarchical arrangement comprising two or more hierarchical levels;
wherein:
a given power control means at a given hierarchical level is arranged to implement a reset procedure requiring a reset to be performed in a given reset domain, where that given reset domain comprises at least a subset of the components provided in multiple power domains associated with multiple power control means provided in at least one hierarchical level below the given hierarchical level;
the given power control means for initiating the reset procedure by issuing a reset entry request for receipt by each of the multiple power control means;
each power control means amongst the multiple power control means for performing, on accepting the reset entry request, a reset preparation procedure in respect of each associated power domain within the multiple power domains to ensure that that associated power domain is in a state that is ready for the reset to be performed in the given reset domain, and for issuing a response signal to confirm that the reset preparation procedure has been performed;
the given power control means for asserting, in response to detecting that the response signal has been issued by each of the multiple power control means, a reset signal to the multiple power domains providing components of the given reset domain in order to cause the reset to be performed in a synchronised manner in respect of all of the components in the given reset domain;
the given power control means for reissuing, in response to detecting that a reject signal has been issued by one or more of the multiple power control means rejecting the reset entry request, the reset entry request for receipt by at least each power control means that has issued the reject signal, with assertion of the reset signal to the multiple power domains providing components of the given reset domain being deferred until detection that the response signal has been issued by each of the multiple power control means; and the given power control means for marking, when re-issuing the reset entry request, the re-issued reset entry request to indicate to the recipient power control means that the re-issued reset entry request is of a higher priority than the originally issued reset entry request.

* * * * *